UNITED STATES PATENT OFFICE.

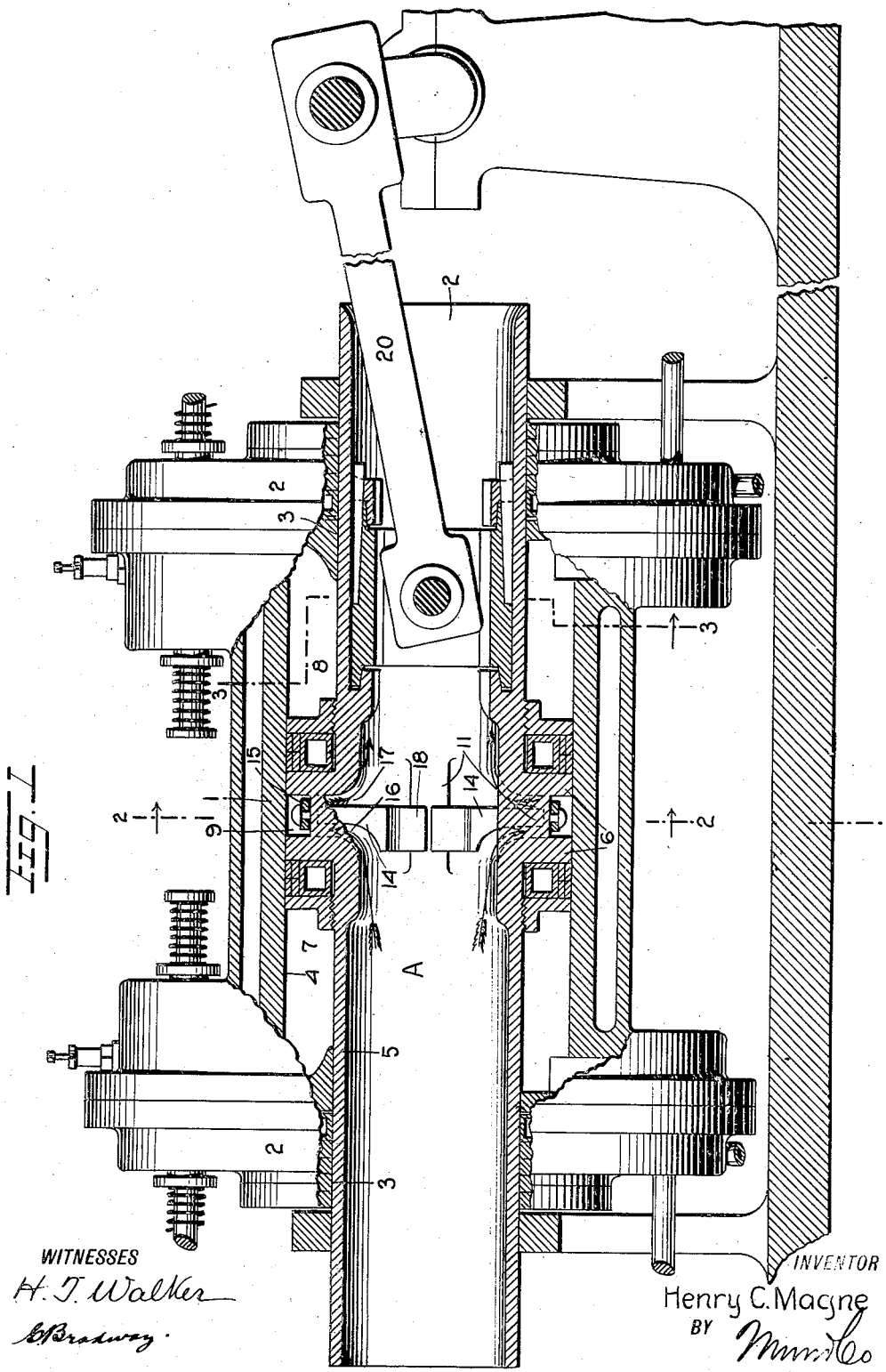

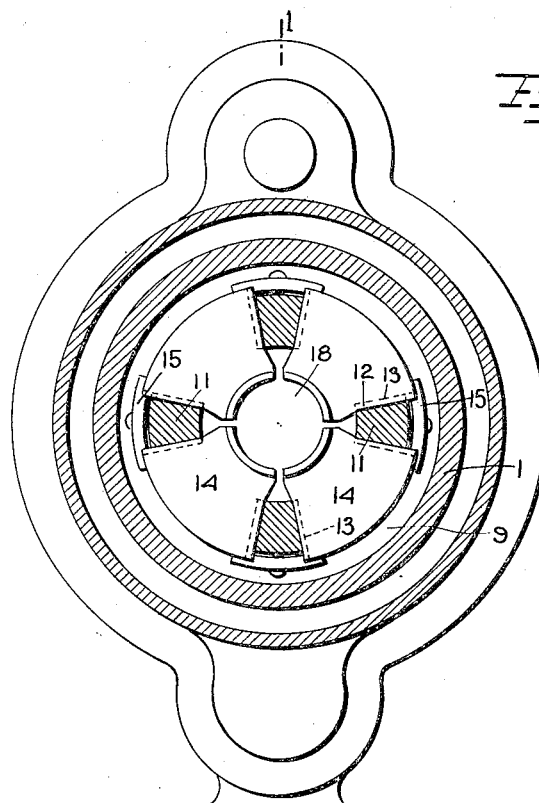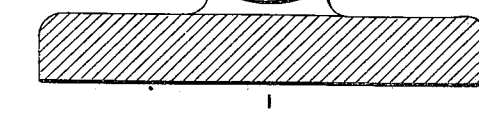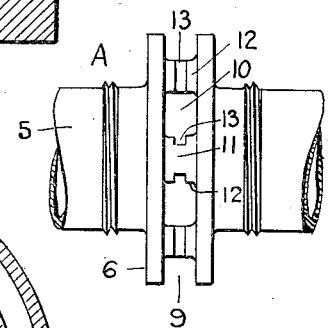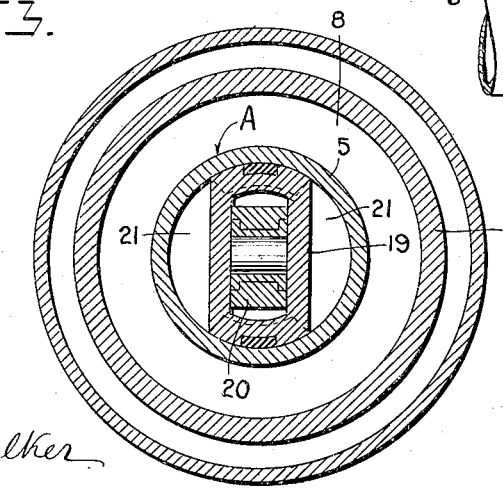

HENRY C. MAGNE, OF GARCES, ARIZONA.

COOLING MEANS FOR INTERNAL-COMBUSTION ENGINES.

1,204,893.    Specification of Letters Patent.    Patented Nov. 14, 1916.

Original application filed September 17, 1914, Serial No. 862,165. Divided and this application filed February 1, 1916. Serial No. 75,521.

*To all whom it may concern:*

Be it known that I, HENRY C. MAGNE, a citizen of the United States, and a resident of Garces, in the county of Cochise and State of Arizona, have invented a new and Improved Cooling Means for Internal-Combustion Engines, of which the following is a full, clear, and exact description.

This invention relates to internal combustion engines of that type in which the piston has an annular head which coöperates with the cylinder of the engine and the body of the piston to form annular explosion chambers in which explosive charges are alternately exploded so as to reciprocate the piston on the double-acting principle, such an engine being disclosed in my application for Letters Patent of the United States, Serial Number 862,165, filed September 17, 1914, and of which application the present is a division.

The invention has for its general objects to provide a simple, effective and improved cooling means whereby air is utilized to cool the internal surface of the cylinder while the piston reciprocates, as well as to cool the piston.

A more specific object of the invention is the provision of a hollow piston which is provided with ports in the periphery of the annular head, and in the piston which is open at its ends are deflectors which cause currents of air to be directed against the internal surface of the cylinder while the piston reciprocates, whereby air cools the piston and cylinder, which latter may, if desired, be externally air or water-cooled.

With such objects in view, and others which will appear as the description proceeds, the invention comprises various novel features of construction and arrangement of parts which will be set forth with particularity in the following description and claims appended hereto.

In the accompanying drawing which illustrates one embodiment of the invention and wherein similar characters of reference indicate corresponding parts in all the views, Figure 1 is a central longitudinal section of the cylinder and piston of the engine taken on the line 1—1, Fig. 2; Fig. 2 is a transverse section on the line 2—2, Fig. 1; Fig. 3 is a transverse sectional view on the line 3—3, Fig. 1; and Fig. 4 is a side view of the central portion of the piston on a reduced scale.

Referring to the drawing, 1 designates the cylinder of the engine which has heads 2 that are provided with central openings 3 of somewhat smaller diameter than the diameter of the cylinder bore 4 in which the piston A reciprocates. The means for admitting the explosive mixture and exhausting the spent gases are not shown in detail as it is unnecessary in order to understand the present invention, which relates entirely to the means for cooling the piston and cylinder.

The piston A comprises a tubular body 5 which has at an intermediate point an annular piston head 6 of substantially the same internal diameter as the internal diameter of the cylinder, so that annular explosion chambers 7 and 8 will be provided at opposite sides of the piston head and between the latter and cylinder heads 2 and the cylinder 1 and piston body 5. The piston head 6 has a circumferential channel or groove 9 which communicates through segmental ports 10 with the interior of the piston body. Between the ports 10 are connecting webs 11 which have their radial faces 12 provided with grooves 13. The tubular piston is open at its ends so that air can flow therethrough, and this air impinges on the internal surface of the cylinder so as to cool the same, and also the piston head itself is effectively cooled.

To assist in directing the air against the internal surface of the cylinder when the piston reciprocates, the segmental deflector plates 14 are set into the ports 10, and their edges are engaged in the grooves 13, and these plates are held in place by cap pieces 15 which are bolted or otherwise fastened to the webs 11. The deflector plates are considerably thinner than the width of the ports 10, so that at opposite sides of the deflectors will be formed passages 16 and 17 whereby the air can flow outwardly through the passage 16 at one side of the deflector plates 14 and strike against the internal wall of the cylinder, then pass over the deflector plates and inwardly through the passage 17 to the hollow of the piston, or vice versa, as the piston reciprocates. The deflector plates coöperate to form a transverse diaphragm or wall in the piston body, but these plates are cut away at the center so as to provide a central opening 18 whereby the resistance offered by the air during reciprocation of the piston will not be so great as otherwise will be the case. The pin block 19 which connects the piston A with the rod 20 is so shaped as to provide passages 21 at opposite sides of the block, so as to permit the air to freely flow relatively to the piston as the same is reciprocated. Since the piston is open at both ends, a current may be induced therethrough by means of a fan or equivalent device. The cylinder is shown as of the water-cooled type, although it may be air-cooled in any well-known manner, and since the cylinder is internally and externally cooled, the bore of the cylinder can be kept in the best condition for a long period of time.

From the foregoing description taken in connection with the accompanying drawing, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claims.

Having thus described my invention, I claim as new and desire to secure by Letters Patent:

1. An explosive engine comprising a cylinder, and a tubular piston mounted therein and open at both ends for air to circulate therethrough and formed with an external annular head whereby annular explosion chambers are provided between the piston and cylinder, said head having circumferential ports whereby air in the piston can impinge on the internal surface of the cylinder and cool the same.

2. An explosive engine comprising a cylinder, a tubular piston mounted therein and open at both ends for air to circulate therethrough and formed with an external annular head whereby annular explosion chambers are provided between the piston and cylinder, said head having circumferential ports whereby air in the piston can impinge on the internal surface of the cylinder and cool the same, and a deflector arranged within the piston for deflecting air passing through the piston outwardly into contact with the cylinder.

3. An explosive engine comprising a cylinder, a tubular piston mounted therein and open at both ends for air to circulate therethrough and formed with an external annular head whereby annular explosion chambers are provided between the piston and cylinder, said head having circumferential ports whereby air in the piston can impinge on the internal surface of the cylinder and cool the same, and a deflector arranged within the piston for deflecting air passing through the piston outwardly into contact with the cylinder, said deflector consisting of a plurality of segmental plates arranged to provide a central opening whereby part of the air flows through the piston without being deflected by the said plates into contact with the cylinder.

4. An explosive engine comprising a cylinder, a piston made in two sections each having a tubular body open at both ends and formed at one end with an external circumferential head and lugs joining the heads of the two sections together and providing between the lugs ports through which air in the piston can impinge on the cylinder to cool the same, and a plurality of air deflecting elements set between and carried by the lugs and serving to direct part of the air flowing through the piston outwardly through the ports and against the cylinder.

5. An explosive engine comprising a cylinder having open heads at its ends, a tubular piston having an annular head provided with circumferential ports, and the ends of the piston being open, whereby air currents can flow therethrough, and means for directing air within the piston against the internal surface of the cylinder through the ports in the piston.

In testimony whereof I have signed my name to this specification in the presence of two subscribing witnesses.

HENRY C. MAGNE.

Witnesses:
 ROBERT TODD,
 ELIZABETH R. TODD.